United States Patent [19]

Tsujimoto

[11] Patent Number: 5,911,094
[45] Date of Patent: Jun. 8, 1999

[54] FIXING DEVICE AND IMAGE FORMING APPARATUSE USING THE SAME

[75] Inventor: Takahiko Tsujimoto, Toyokawa, Japan

[73] Assignee: Minolta Co., Ltd., Osaka, Japan

[21] Appl. No.: 08/931,160

[22] Filed: Sep. 16, 1997

[30] Foreign Application Priority Data

Sep. 17, 1996 [JP] Japan ..................................... 8-244498

[51] Int. Cl.⁶ ................................................. G03G 15/20
[52] U.S. Cl. ............................ 399/69; 219/619; 399/330
[58] Field of Search ................................. 399/38, 44, 67, 399/69, 130, 320, 328, 330; 219/200, 216, 469, 619, 634, 643, 644, 645, 650, 659, 667, 671

[56] References Cited

U.S. PATENT DOCUMENTS

| | | | |
|---|---|---|---|
| 4,764,652 | 8/1988 | Lee | ...................................... 219/667 X |
| 4,914,476 | 4/1990 | Nishitsuji et al. | ......................... 399/44 |
| 5,752,150 | 5/1998 | Kato et al. | ............................... 399/330 |

FOREIGN PATENT DOCUMENTS 58-129271  8/1983  Japan .
07287471  10/1995  Japan .

*Primary Examiner*—Arthur T. Grimley
*Assistant Examiner*—Hoan Tran
*Attorney, Agent, or Firm*—McDermott, Will & Emery

[57] ABSTRACT

An induction heating type fixing device for causing a toner image formed on a sheet to be fixed on the sheet. This fixing device contains a fixing roller formed of a conductive member in a cylindrical shape, a core passed through the interior of the fixing roller and intended to form a closed magnetic circuit, an induction coil wound around the core, a power source for forwarding an alternating circuit to the induction coil, a switch for passing or breaking the alternating current supplied from the power source to the induction coil, an electric current amount detecting coil for detecting the amount of an electric current flowing from the power source to the induction coil, a thermistor for detecting the temperature of the fixing roller, and a CPU for controlling the switch so as to forward an alternating current to the induction coil until the amount of the electric current detected by the electric current amount detecting coil reaches a prescribed amount and, after the amount of the electric current detected by the electric current amount detecting coil has reached the prescribed amount, controlling the switch so as to repeat the passage and the breakage of the alternating current to the induction coil and enable the temperature of the fixing roller to be retained at a predetermined temperature fit for the fixation of the toner image.

38 Claims, 11 Drawing Sheets

FIXING DEVICE AND IMAGE FORMING APPARATUSE USING THE SAME

BACKGROUND OF THE INVENTION

1. Field of the Invention

This invention relates to such image forming apparatuses as, for example, electrophotographic copying machines, printers, and facsimile systems or to a fixing device to be used in such apparatuses. More particularly, it relates to an induction heating type fixing device which, by virtue of an alternating current applied to a coil, a fixing roller made of a conductive material is caused to generate an induced electric current and consequently is heated with the induced electric current.

2. Description of the Related Art

The electrophotographic copying machines, printers, facsimile systems, etc. are provided with the fixing device which fixes on the sheets of such recording media as recording papers or transfer materials a toner image transferred onto the sheets.

The fixing device is provided, for example, with a fixing roller for thermally fusing the toner on the sheet and a pressure roller pressed against the fixing roller and enabled to nip the sheet in cooperation therewith. The fixing roller is formed in a cylindrical shape, provided inside the cylinder with a heating element, and adapted to heat the fixing roller to a temperature necessary for melting and fixing the toner.

Heretofore, the heating elements of this class have utilized predominantly a halogen lamp, for example, which is disposed along the axis of the fixing roller and adapted to heat the fixing roller with the radiant heat thereof. Though the heating elements using the halogen lamp are inexpensive, they suffer from low thermal efficiency and heavy energy loss because the radiant heat is used for the heating.

The fixing devices using the induction heating have been proposed with a view to eliminating such weak points of the heating with the halogen lamp as mentioned above and fulfilling the demand voiced in recent years for conservation of energy and the demand for faster printing operation.

The fixing devices resorting to the induction heating are broadly divided into two types. To one of the two types belong such low-frequency induction heating fixing devices as generate heat by winding a coil around a core (iron core) forming a closed magnetic circuit, disposing a conductive fixing roller in such a manner as to encircle the core enwrapped with the coil, and directly advancing an alternating current from a commercial power source, namely an alternating current of a frequency of 50–60 Hz, to the coil thereby causing the fixing roller to generate an induced electric current. To the other type belong such high-frequency induction heating fixing devices as generate heat by winding a coil around a core (iron core) optionally forming or not forming a closed magnetic circuit, disposing a conductive fixing roller in such a manner as to enclose the core enwrapped with the coil, and advancing a high frequency of several kHz—some hundreds of kHz to the coil thereby causing the fixing roller to generate an eddy current.

The fixing device using the induction heating as described above has a large effect in conserving energy and is capable of elevating temperature with only a small amount of electric power as compared with the halogen lamp. The low-frequency induction heating fixing device in particular obviates the necessity for a circuit adapted to generate a high frequency and allows the temperature of the fixing roller to be controlled at a virtually constant level by simply controlling the ON-OFF state of the alternating current applied from the commercial power source to the coil as compared with the high-frequency induction heating fixing device. It, therefore, is at an advantage in enjoying simplicity of the construction of the device and allowing the device to be manufactured at a low cost. It further enjoys a great energy conserving effect because it entails virtually no leakage of magnetic flux and allows efficient generation of an induced electric current in the fixing roller on account of the provision of the core forming a closed magnetic circuit.

While the low-frequency induction heating fixing device has such a great energy conserving effect as described above, it has various problems yet to be solved. One of the problems is that the adjustment of temperature becomes difficult because the induction heating by nature heightens the temperature increasing rate of the fixing roller. When the halogen lamp is used as a heat source, the temperature of the halogen lamp can be properly adjusted by measuring the temperature of the fixing roller with a thermistor and feeding back the result of this measurement because the rate of the temperature variation of the fixing roller is not very high owing to the thermal capacity of the halogen lamp itself and the thermal capacity of the fixing roller. In the case of the induction heating, the fixing roller itself generates heat as soon as the electric power is supplied to the coil and the rate of the temperature elevation of the fixing roller at times surpasses the speed of response of the thermistor. Especially when the temperature is elevated from the normal room temperature to the fixing temperature, the delay of the response of the thermistor possibly compels the fixing roller to yield to an excessive temperature elevation.

The fixing device utilizing high-frequency induction heating as disclosed in JP-A-07-287,471, for example, eliminates this problem by using for a fixing roller itself which is subjected to induction heating an element resembling a thermistor and controlling the high-frequency electric current applied to the coil in consequence of the elevation of temperature of the fixing roller.

This method is feasible solely because it concerns a high-frequency induction heating resorting to such a high-frequency control circuit as a converter which is capable of constantly applying a high frequency to the coil and controlling the frequency, the applied voltage, or the amount of electric current thereof. The method of the principle disclosed in the patent publication mentioned above, however, cannot be utilized when the temperature is adjusted, according to the feature of low-frequency induction heating, by switching the alternating current from the commercial power source without resorting to the use of a special control circuit as a power source.

Another problem of the low-frequency induction heating fixing device is that the induction heating, unlike the halogen lamp, does not permit direct discernment of the presence or absence of passage of electric current therethrough from the appearance. The halogen lamp continues to light so long as it is passing electricity, namely while it is kept hot by the passage of electricity. When the door of the copying machine is opened to inspect the interior for the purpose of maintenance, therefore, a look at the halogen lamp suffices to find whether or not it is lighting, namely whether or not it is passing electricity. The induction heating does not permit discernment of actual presence or absence of the passage of electricity because it has no light-emitting element of any sort. The same remarks hold good where the temperature of the fixing roller is detected by a thermistor, for example. While the fixing roller is being heated, the remaining heat thereof possibly compels the thermistor to manifest a state of high temperature even during an interruption of the passage of electricity. Thus, the question whether the warmth of the thermistor is caused by the heating due to the passage of electricity or by the remaining heat eludes a decision.

Further, the maintenance of the device which resorts to induction heating poses a new problem that since this device has no such a light-emitting element as a halogen lamp, how the trouble in the coil or the switching circuit serving to control the passage of electricity to the coil should be diagnosed is a query.

SUMMARY OF THE INVENTION

An object of this invention, therefore, is to obtain an induction heating fixing device which precludes excess elevation of temperature and allows an appropriate adjustment of temperature, especially a fixing device which is advantageous for effecting low-frequency induction heating. Another object of this invention is to obtain an image-forming apparatus which is provided with the induction heating fixing device described above.

A further object of this invention is to obtain an induction heating fixing device which can infallibly detect passage of electricity to the coil, especially a fixing device which is advantageous for effecting low-frequency induction heating. Still another object of this invention is to obtain an image-forming apparatus which is provided with the induction heating fixing device described above.

Yet another object of this invention is to obtain an induction heating fixing device which is so constructed that the trouble in a coil or in a switching circuit is adequately diagnosed, especially a fixing device which is advantageous for effecting low-frequency induction heating. A yet further object of this invention is to obtain an image-forming apparatus which is provided with the induction heating fixing device described above.

In order to achieve the above objects, according to an aspect of the invention, an image-forming apparatus comprises a fixing roller formed of a conductive member, a core passing the interior of the fixing roller, an induction coil wound around the core, a power source part which supplies an alternating current to the induction coil, a switching circuit which passes or breaks the electric current supplied from the power source part to the induction coil, a detector which detects the amount of the electric current supplied from the power source part to the induction coil, a temperature sensor which detects the temperature of the fixing roller, and a controller which controls the switching circuit so as to supply the electric current to the induction coil until the amount of the electric current detected by the detector reaches a prescribed amount and, after the amount of the electric current detected by the detector has reached the prescribed amount, controls the switching circuit so as to pass or break the electric current to the induction coil based on the temperature detected by the temperature sensor.

According to another aspect of the invention, an image-forming apparatus comprises a fixing roller formed of a conductive member, a core passing the interior of the fixing roller, an induction coil wound around the core, a power source part which supplies an alternating current to the induction coil, a detector which detects the amount of the electric current supplied from the power source part to the induction coil, and a controller which estimates the temperature of the fixing roller based on the amount of an electric current detected by the detector and, based on the estimated temperature, predicts the time which elapses until the prescribed temperature is reached.

According to still another aspect of the invention, an image-forming apparatus comprises a fixing roller formed of a conductive member, a core passing the interior of the fixing roller, an induction coil wound around the core, a power source part which supplies an alternating current to the induction coil, a switching circuit which passes or breaks the electric current supplied from the power source part to the induction coil, a detector which detects the amount of the electric current supplied from the power source part to the induction coil, and a controller which controls the switching circuit so as to supply the electric current to the induction coil until the amount of the electric current detected by the detector reaches a prescribed amount and, after the amount of the electric current detected by the detector has reached the prescribed amount, controls the switching circuit so as to pass or break the electric current to the induction coil based on the amount of the electric current detected by the detector.

According to a further aspect of the invention, an image-forming apparatus comprises a fixing roller formed of a conductive member, a core passing the interior of the fixing roller, an induction coil wound around the core, a power source part which supplies an alternating current to the induction coil, a controller which effects such a control as to elevate the temperature of the fixing roller to a prescribed temperature and, at the same time, retain the prescribed temperature by supplying an electric current from the power source part to the induction coil, and a detector disposed on a wire for supplying an electric current from the power source part to the induction coil and adapted to detect the fact that a current is flowing through the wire.

According to a still further aspect of the invention, an image-forming apparatus comprises a fixing roller formed of a conductive member, a core passing the interior of the fixing roller, an induction coil wound around the core, a power source part which supplies an alternating current to the induction coil, a first detector disposed on a wire which supplying an electric current from the power source part to the induction coil and adapted to detect the fact that an electric current is flowing through the wire, a second detector which detects the open-close state of a door of the image-forming apparatus, and a controller which effects such a control as to interrupt the supply of an electric current to the induction coil when the door is opened while the flow of the electric current through the wire is present in accordance with the outcome of the detection of the first detector and the second detector.

According to a yet further aspect of the invention, an image-forming apparatus comprises a fixing roller formed of a conductive member, a core passing the interior of the fixing roller, an induction coil wound around the core and supplied with an alternating current from a power source, a switching circuit which passes or breaks an electric current supplied to the induction coil, a detector which detects the amount of an electric current supplied to the induction coil, a temperature sensor which detects the temperature of the fixing roller, and a controller which controls the switching circuit so as to supply the electric current to the induction coil until the amount of the electric current detected by the detector reaches a prescribed amount and, after the amount of the electric current detected by the detector has reached the prescribed amount, controls the switching circuit so as to pass or break the electric current to the induction coil based on the temperature detected by the temperature sensor.

According to a yet further aspect of the invention, a fixing device comprises a fixing roller formed of a conductive member, a core passing the interior of the fixing roller, an induction coil wound around the core and supplied with an alternating current from a power source, a detector which detects the amount of an electric current supplied to the induction coil, and a controller which estimates the temperature of the fixing roller based on the amount of an electric current detected by the detector and, based on the estimated temperature, predicting the time which elapses until the prescribed temperature is reached.

According to a yet further aspect of the invention, a fixing device comprises a fixing roller formed of a conductive member, a core passing the interior of the fixing roller, an induction coil wound around the core and supplied with an alternating current from a power source, a switching circuit which passes or breaks an electric current supplied to the induction coil, a detector which detects the amount of an electric current supplied to the induction coil, and a controller which controls the switching circuit so as to supply the electric current to the induction coil until the amount of the electric current detected by the detector reaches a prescribed amount and, after the amount of the electric current detected by the detector has reached the prescribed amount, controls the switching circuit so as to pass or break the electric current to the induction coil based on the amount of an electric current detected by the detector.

According to a yet further aspect of the invention, a fixing device comprises a fixing roller formed of a conductive member, a core passing the interior of the fixing roller, an induction coil wound around the core and supplied with an alternating current from a power source, a controller which effects such a control as to elevate the temperature of the fixing roller to a prescribed temperature and, at the same time, retain the prescribed temperature by supplying an electric current to the induction coil, and a detector disposed on a wire for supplying an electric current from the power source part to the induction coil and adapted to detect the fact that a current is flowing through the wire.

According to a yet further aspect of the invention, an fixing device comprises a fixing roller formed of a conductive member, a core passing the interior of the fixing roller, an induction coil wound around the core and supplied with an alternating current from a power source, a first detector disposed on a wire supplying an electric current to the induction coil and adapted to detect the fact that an electric current is flowing through the wire, a second detector which detects the open-close state of a door of a housing accommodating the fixing device, and a controller which effects such a control as to interrupt the supply of an electric current to the induction coil when the door is opened while the flow of the electric current through the wire is present in accordance with the outcome of the detection of the first detector and the second detector.

DESCRIPTION OF THE PREFERRED EMBODIMENTS

The working embodiments of this invention constructed as described above will be described below with reference to the drawings annexed hereto.

Embodiment 1

Figure 1:
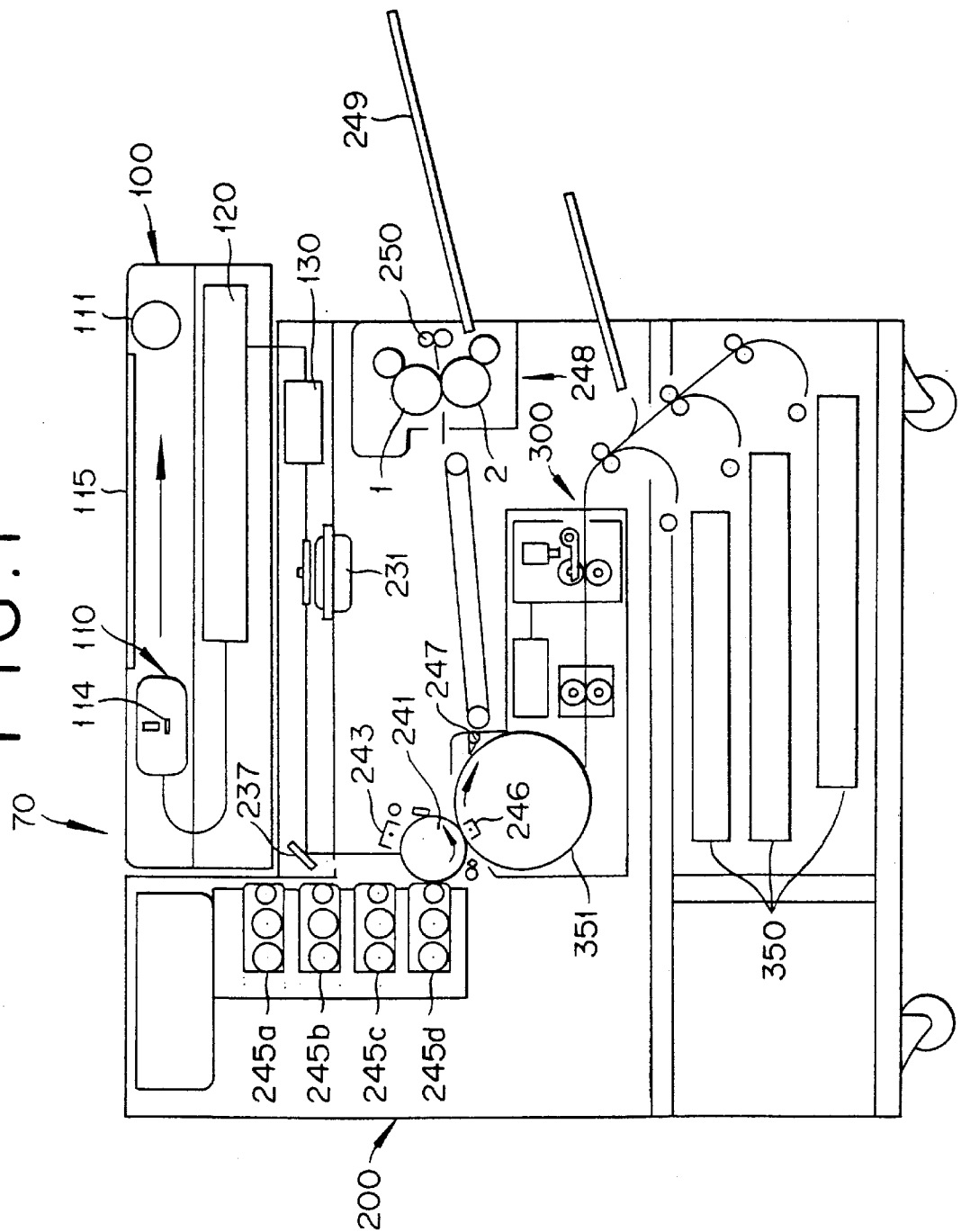
FIG. 1 is a diagram schematically illustrating the construction of an image-forming apparatus according to the first embodiment of this invention.

FIG. 1 is a diagram schematically illustrating the construction of an image-forming apparatus according to Embodiment 1 of this invention. This image-forming apparatus 70 is what is called a digital color copying machine and is broadly divided into an image reader part 100 for reading an image on an original document and a copying part 200 for reproducing an image from the image data read by the image reader part 100. This copying part 200 has built therein a sheet conveying device 300 for conveying a paper supplied from a paper-supplying cassette 350.

The image reader part 100 is provided with a scanner 110 for reading the image. This scanner 110 is driven by a motor 111, moved in the direction of an arrow (secondary scanning direction) in the diagram, and caused to scan the original document mounted on a platen 115. A CCD line sensor 114 provided for the scanner 110 emits multiple-valued electric signals of the three primary colors R, G, and B of the scanned original document. The multiple-valued electric signals of R, G, and B emitted from the CCD line sensor 114 are converted into 8-bit tone data of cyan, magenta, yellow, and black at a read signal processing part 120, subjected as to MTF correction, and memorized in a synchronizing buffer memory 130.

The copying part 200 is provided with a printer head part 231. This printer head part 231 emits a laser beam based on the 8-bit tone data to be introduced. The laser beam emitted by the printer head part 231 is advanced via a reflecting mirror 237 and caused to irradiate a photosensitive drum 241 driven in rotation. The photosensitive drum 241 is uniformly charged by a charger 243. When the photosensitive drum 241 in the ensuant state is exposed, an electrostatic latent image of the original document is formed thereon. Toner developers 245a–245d of cyan, magenta, yellow, and black are sequentially selected to develop the electrostatic latent image on the photosensitive drum 241. During this process of development, a paper of a stated size from the paper-supplying cassette 350 is advanced via the sheet-conveying device 300 to a transfer drum 351.

The toner image developed on the photosensitive drum 241 is transferred by a transfer charger 246 onto the paper wrapped on the transfer drum 351. Subsequently, the paper is separated by a separation claw 247 from the transfer drum 351 and, after the toner image has been fixed at a fixing device 248, discharged into a discharged paper tray 249.

Figure 2:
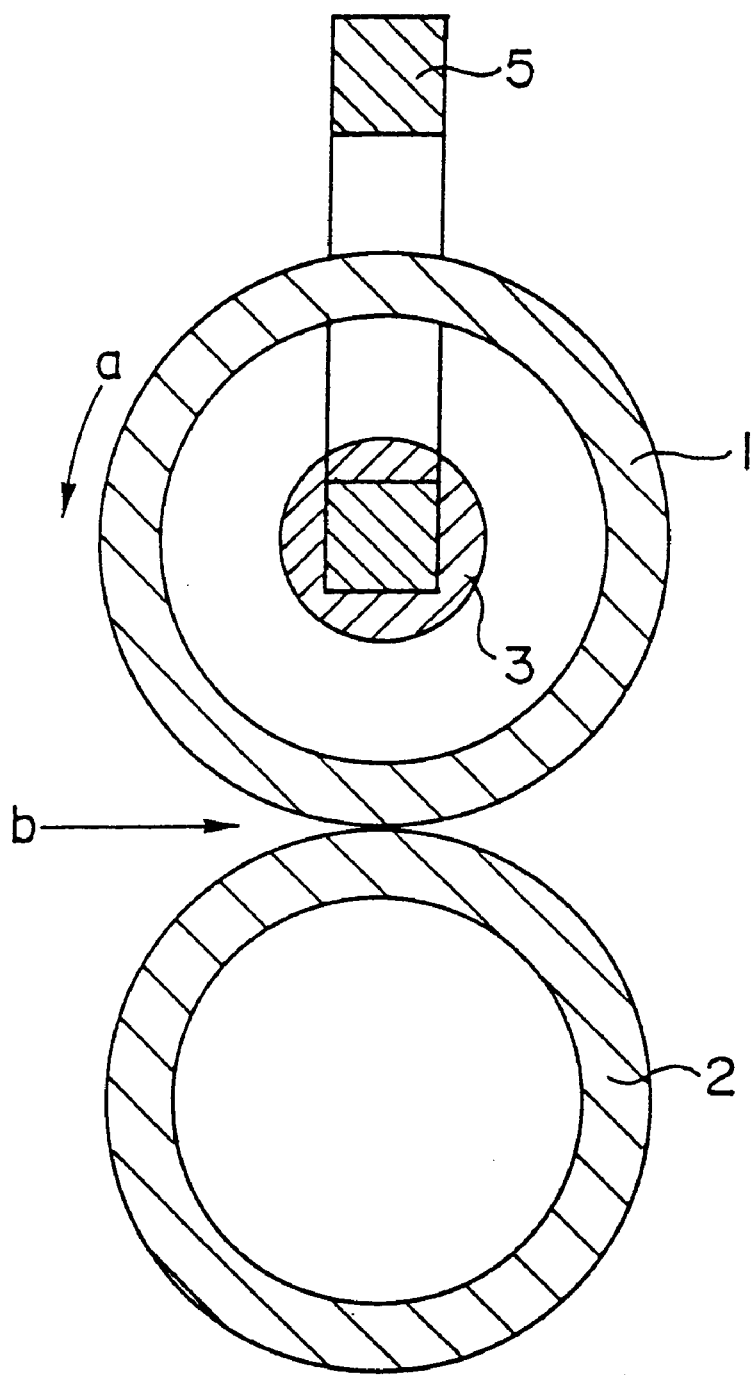
FIG. 2 is a cross section schematically illustrating the construction of an induction heating fixing device in the first embodiment of this invention.
Figure 3:
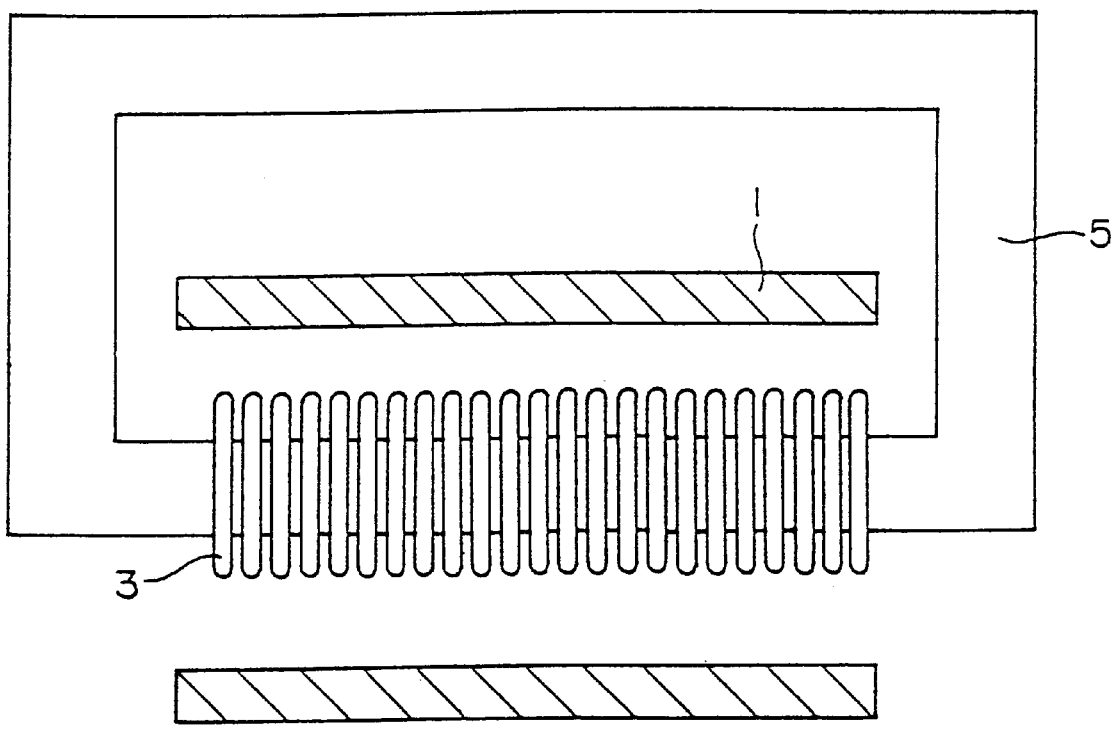
FIG. 3 is a diagram schematically illustrating the construction of a fixing roller part in the induction heating device mentioned above.

FIG. 2 is a cross section schematically illustrating the construction of the interior of the fixing device 248 used in the image-forming apparatus described above and FIG. 3 is a diagram illustrating the construction of the fixing roller part of this fixing device.

This fixing device is a fixing device of the low-frequency induction heating system and is provided with a fixing roller 1 disposed so as to be driven rotatably in the direction of an arrow a and a pressure roller 2 disposed as pressed against the fixing roller 1 and rotated by following the rotation of the fixing roller 1. The fixing roller 1 is a cylindrical hollow pipe of conductive material. It is formed of a conductive member such as, for example, a carbon steel pipe, a stainless alloy pipe, or an aluminum pipe and coated on the outer peripheral surface thereof with a heat-resistant release layer of fluorine resin. The pressure roller 2 comprises an axial core and a surface release layer of heat-resistant rubber such as, for example, silicone rubber applied to coat the periphery of the axial core.

A core 5 surrounded by an induction coil 3 and forming a closed magnetic circuit partly pierces the interior of the fixing roller 1.

The core 5 is a so-called iron core which is used as in ordinary transformers. It is preferred, for example, to be an iron core formed of superposed silicon steel sheets and possessed of high permeability. Of course, it does not need to be a laminated iron core but maybe a columnar iron core instead.

The induction coil 3 is manufactured by winding around the core 5 a standard simple conductor provided on the surface thereof a fused layer and an insulating layer.

The fixing operation of this fixing device consists in heating the fixing roller 1 by the induction heating as described hereinbelow until the temperature of the fixing roller 1 reaches a temperature (such as, for example, 150–200° C.) which fits the fixation. The fixing roller 1 in the heated state and the pressure roller 2 rotate in mutually opposite directions while keeping sliding contact and the paper having the toner applied fast thereto is moved in the direction of an arrow b and nipped between the rollers. In the sliding contact part between the fixing roller 1 and the pressure roller 2 (hereinafter referred to as "nip part"), the toner on the paper is melted by the heat of the fixing roller 1 and fixed on the paper by the pressure exerted jointly by the two rollers. After the toner is fixed, the paper is conveyed by a paper-discharging roller 250 (FIG. 1 refers) in consequence of the rotation of the fixing roller 1 and the pressure roller 2 and released onto the discharged paper tray 249 (FIG. 1 refers).

Figure 4:
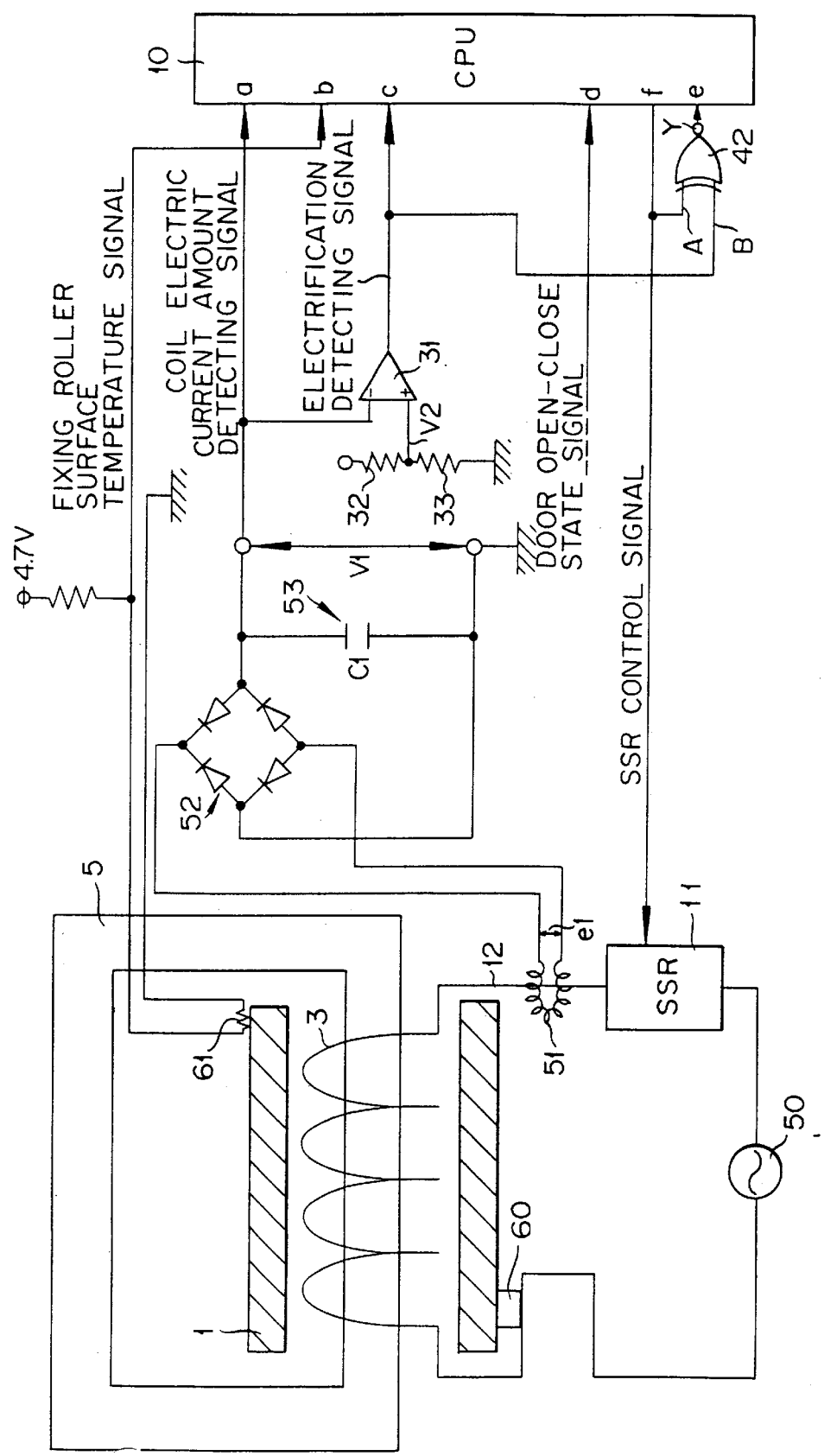
FIG. 4 is a block diagram showing the construction of an electric system of the induction heating fixing device mentioned above.

The electric system of the fixing device, as illustrated in FIG. 4, is composed of a solid state relay (SSR) 11 which is a switching circuit for passing or breaking an alternating current from a power source 50 directly utilizing the alternating current of a commercial power source to the induction coil 3, a detection coil 51 disposed on a wire 12 for supplying the alternating current to the induction coil 3 and caused by the alternating current flowing through the wire to generate an induced electromotive force, a bridge circuit 52 and a smoothing capacitor 53 for converting the alternating current generated in the detection coil 51 into a direct current, a comparator 31 for comparing the voltage of the direct current resulting from the conversion with a standard voltage, resisting elements 32 and 33 for supplying the standard voltage to the comparator 31, an EX-NOR element 42 for comparing the output from the comparator 31 with an SSR control signal of a CPU 10 which will be described hereinafter, a thermistor 61 for detecting the temperature of the fixing roller 1, and the CPU 10 for controlling an SSR 11. Between the commercial power source 50 and the coil 3, a thermostat 60 for forcibly breaking the supply of the electric current from the power source 50 when the fixing roller 5 assumes an abnormally heated state.

The reason for using the SSR 11 in switching the supply of the alternating current to the induction coil 3 is that the commercial power source is used in its unmodified form as the power source for the induction coil 3 and, therefore, the noise from the commercial power source must be prevented from entering the electric system of the CPU and other control units and, in the case of a trouble, the voltage of the commercial power source per se must be precluded from entering the control system. The use of this SSR 11, therefore, is not critical. A switching circuit which, as by the use of a photocoupler, is enabled to effect the control while separating the induction coil 3 and the control system may be adopted in the place of the SSR 11.

Now, the operation of temperature elevation carried out by the fixing device which is constructed as described above will be explained below (FIG. 4 refers regarding the circuitry).

First, the basic operation of induction heating will be explained. The induction heating fixing device is identical in basic construction with a transformer. Specifically, the induction coil 3 corresponds to the primary side coil (N winding) and the fixing roller 1 to the secondary side coil (1 winding). When an alternating current voltage v1 in the approximate range of 50–60 Hz is applied to the primary side coil, an electric current i1 flows through the primary side coil. A magnetic flux is consequently generated in the core 5 and this magnetic flux causes the fixing roller 1 which is the secondary side coil to generate an induced electromotive force v2 and give rise to the flow of an electric current i2. As a result, the fixing roller 1 emits heat by virtue of the resistance (resistance loss) of its own.

Next, the operation of temperature elevation will be explained. In the operation of temperature elevation, first the electrification of the coil is started for elevating the temperature from the normal room temperature and the supply of an alternating current to the induction coil 3 is continued with the SSR 11 kept constantly in the ON state until the temperature reaches a level appropriate for the fixation. At this time, the fixing roller 1 generates the induced electromotive force and emits the heat as described above.

Figure 5:
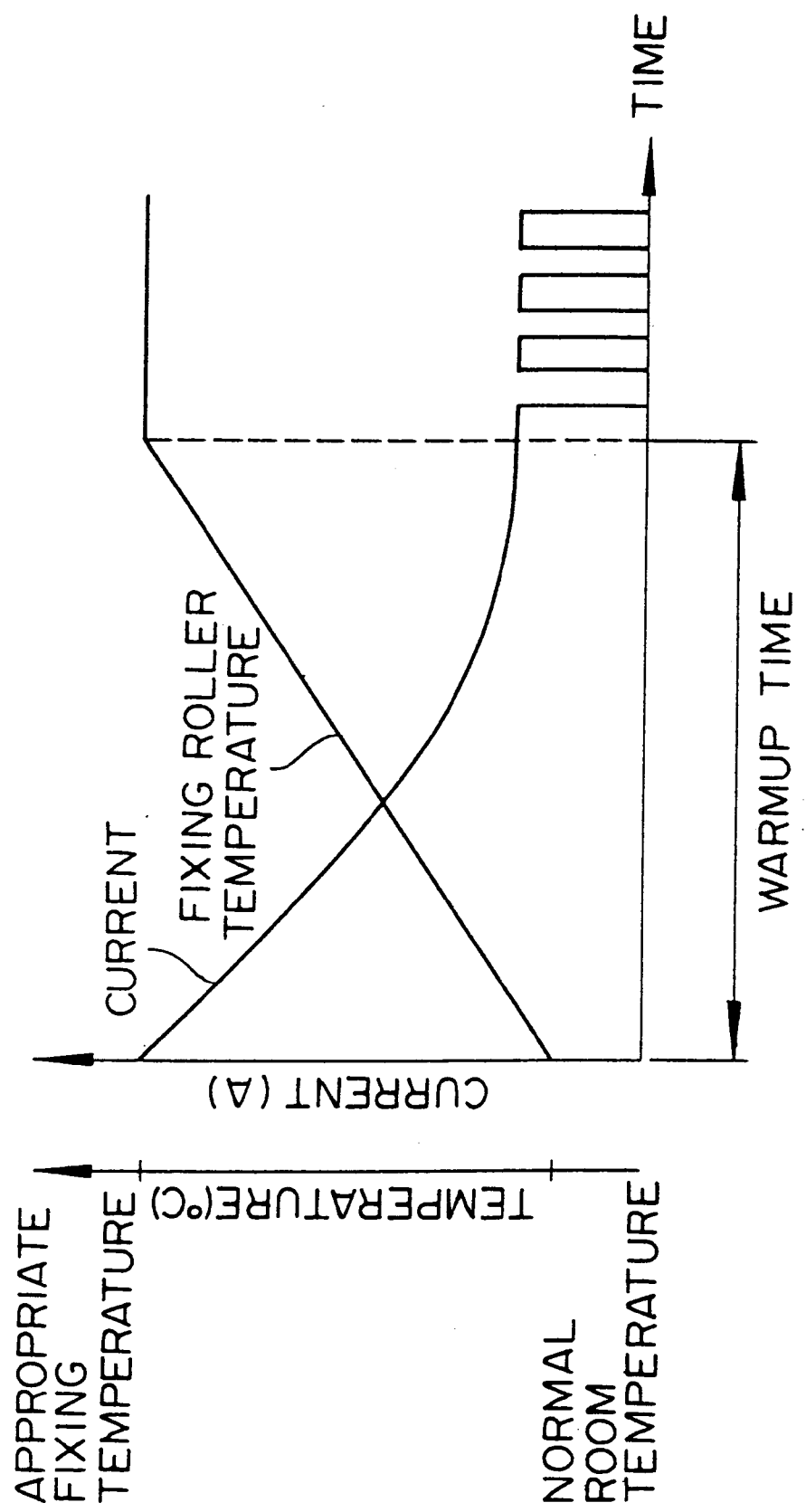
FIG. 5 is a diagram showing the relation between the temperature of the fixing roller and the magnitude of an electric current flowing through an induction coil.

The fixing roller 1, as an attribute common to all the conductive materials forming a fixing roller, manifests a phenomenon that the amount of electric current flowing therein declines in accordance as the temperature thereof rises. This decline of the amount of electric current in the fixing roller 1 directly manifests itself as a decrease in the amount of electric current flowing in the primary side coil engaging in an electromagnetic coupling, namely the induction coil 3. This process is depicted in FIG. 5. In the diagram, an area indicated as "warmup time" represents an interval required for the temperature to rise from the normal room temperature to the level appropriate for the fixation (200° C. herein). It is clearly noted from the diagram that the amount of electric current in the induction coil 3 decreases in proportion as the temperature of the fixing roller 1 increases.

Figure 6:
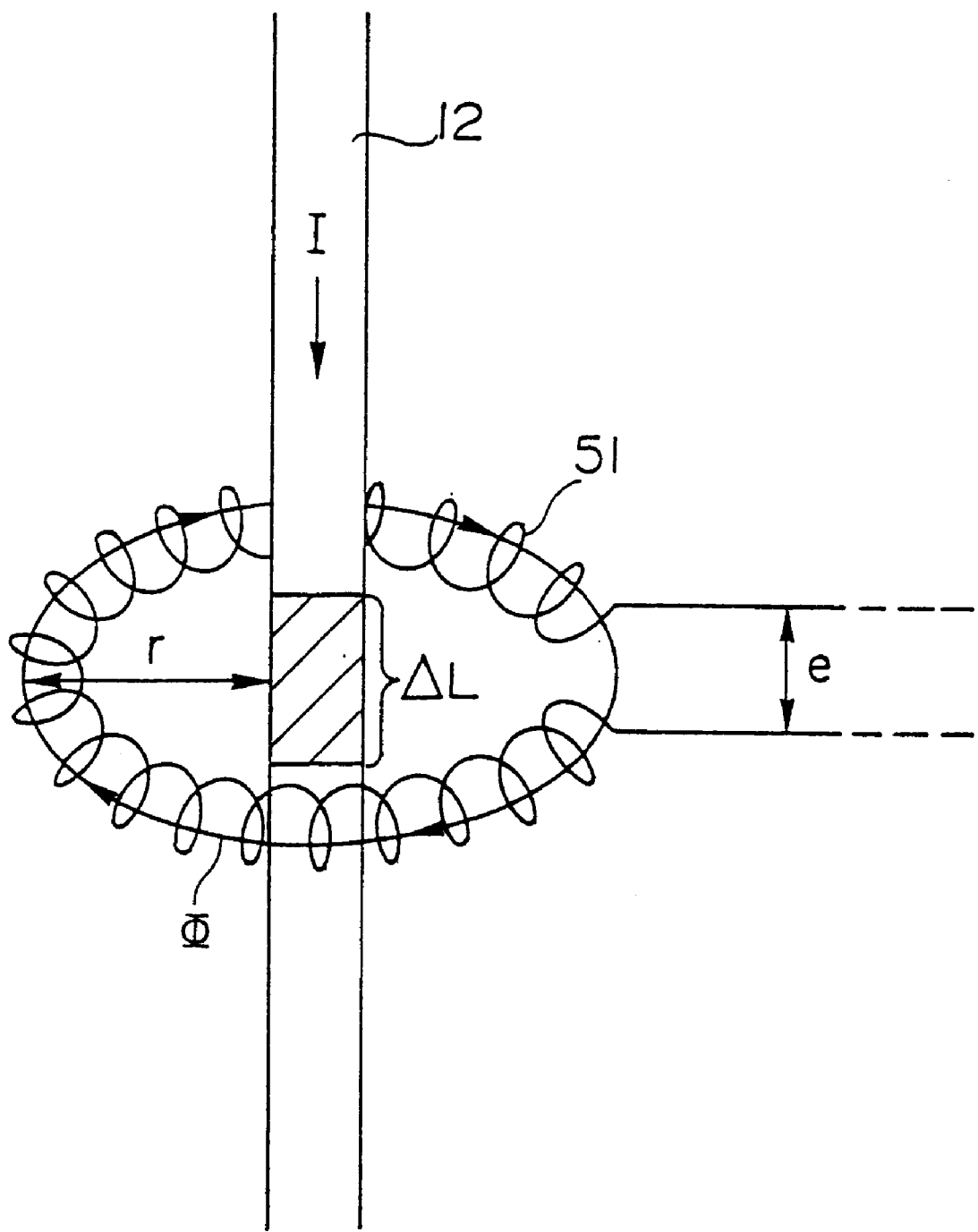
FIG. 6 is a diagram to aid in the description of a detecting coil disposed in the induction heating fixing device mentioned above.
Figure 7:
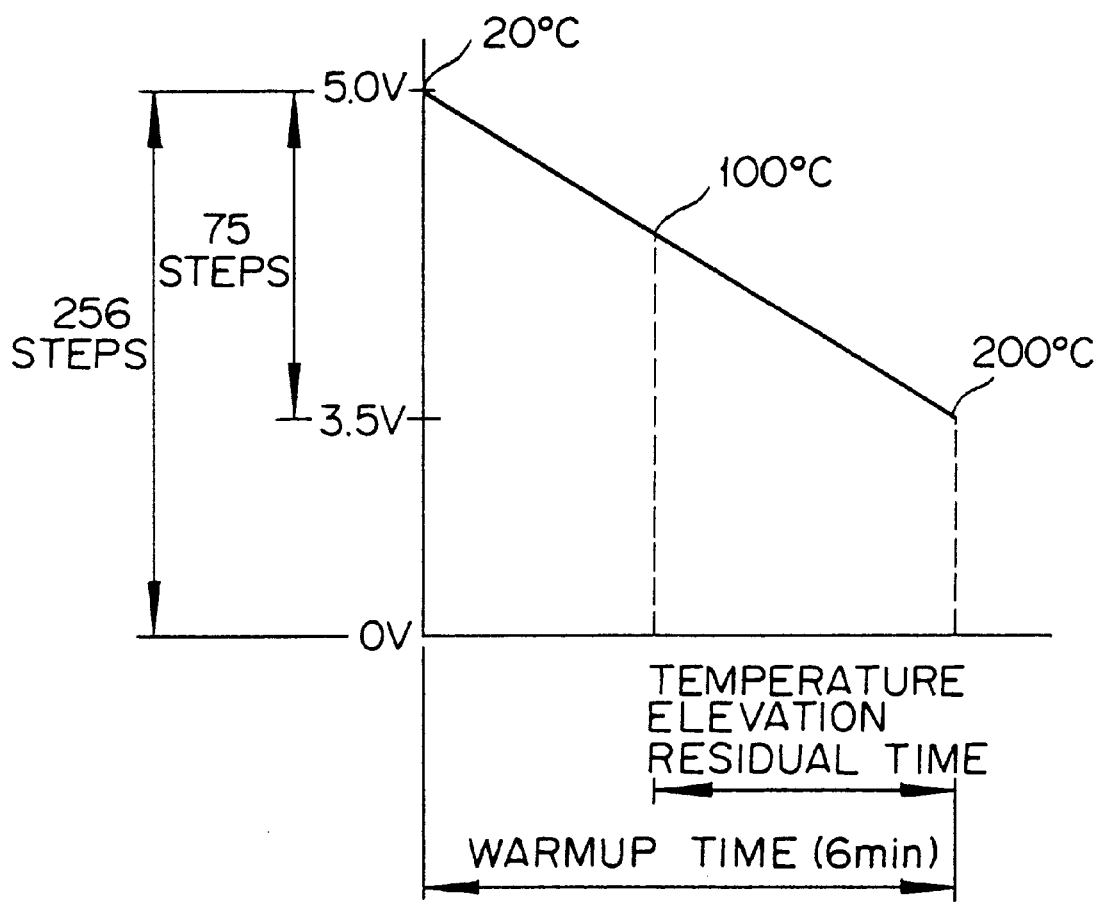
FIG. 7 is a diagram to aid in the description of a method for calculating the residual time during the elevation of temperature.

In Embodiment 1, the amount of electric current flowing through the induction coil 3 is detected by the detection coil 51. This detection coil 51, as illustrated in FIG. 6, has the coil 51 so disposed as to encircle helically a wire 12 which is supplying an alternating current from the power source 50 to the induction coil 3. This detection coil 51 is caused to generate an induced electromotive force by a magnetic field which is produced in proportion to the amount of alternating electric current flowing through the wire 12.

The induced electromotive force so generated can be found by the Biot-Savart law and the Faraday's law of electromagnetic induction. First, the magnetic flux density ΔB of the magnetic field produced by the electric current flowing through a minute area ΔL of the wire 12 is expressed as follows.

$$\Delta B = (\mu_o I)/(4\pi r^2) \times \Delta L$$

(wherein r stands for the distance from the wire 12 to the magnetic flux, which equals the distance from the wire 12 to the axis of the detection coil 51 herein, and $\mu o$ for the permeability in a vacuum).

The magnetic flux ΔΦ is expressed as follows.

$$\Delta \Phi = \Delta B S$$

(wherein S stands for the cross section of the coil).

The electromotive force e which is produced by this magnetic flux in the detection coil 51 is expressed as follows.

$$e = n(\Delta \Phi / \Delta t)$$

(wherein n stands for the number of turns of the detection coil 51).

Since the induced magnetic force which is generated in the detection coil 51 is an alternating current, it must be transformed into a direct current voltage so as to be read as connected to an analog port of the CPU 10. In Embodiment 1, therefore, the induced electromotive force of the detection coil 51 is transformed into a direct current by the bridge rectifying circuit 52 and the smoothing capacitor 53 and injected into the CPU 10 via an analog port a. The magnitude of the direct current voltage which is injected through the analog port a will be referred to as "coil electric current amount detection signal."

The CPU 10, therefore, reads the fact that the temperature of the fixing roller 1 rises and the amount of the alternating electric current flowing through the induction coil 3 falls as shown in FIG. 5 in the form of a change in the direct current voltage. The CPU 10 compares the direct current voltage with the magnitude of voltage which exists when the fixing roller 1 reaches the temperature appropriate for the fixation as stored in advance in a memory not shown in the diagram and effects a control such that the SSR 11 may remain in the ON state and the application of an alternating current to the induction coil 3 may last until the magnitude of voltage introduced via the analog port a equals the stored magnitude of voltage. After the magnitude of voltage introduced via the analog port a has reached the stored magnitude of voltage, the CPU 10 controls the temperature at the level appropriate for the fixation as described above.

After the temperature of the fixing roller 1 has reaches the level appropriate for the fixation, the SSR 11 is switched in accordance with the actual temperature of the fixing roller 1 measured by the thermistor 61 so as to control the temperature of the fixing roller 1 at a fixed level. For this purpose, the CPU 10 admits through the analog port b thereof the change in voltage of the thermistor 61 dependent on the change in temperature of the fixing roller 1, compares the changed voltage with the preset magnitude of voltage, and simply controls the ON-OFF state of the alternating current supplied from the power source 50 to the induction coil 3 as by turning off the SSR 11 when the changed voltage surpasses the stated level or turning on the SSR 11 when the changed voltage does not surpass the stated level.

The operation of temperature elevation has been described. In Embodiment 1, the waiting time for temperature elevation is displayed by the coil electric current amount detection signal issued during the operation of temperature elevation (the warmup area in FIG. 5). This display utilizes the fact that a relation of inverse proportion exists between the temperature of the fixing roller 1 and the magnitude of electric current flowing through the induction coil 3 as shown in FIG. 5 mentioned above. When the analog port a of the CPU 10 is capable of admitting 8 input bits, for example, the coil electric current amount detection signal introduced into the analog port a can be detected as divided into 256 steps. By preparatorily storing the fixing roller temperatures corresponding to the magnitudes of voltage at the individual steps and, based on the stored data of temperature, calculating the time required for a relevant temperature to reach the level appropriate for the fixation, therefore, the waiting time for temperature elevation can be found and displayed on the operating panel such as on the copying machine.

Specifically, on the assumption that the magnitude of voltage of the coil electric current amount detection signal which is emitted when the magnitude of electric current flowing through the induction coil 3 is detected while the fixing roller 1 is remaining at the normal room temperature (20° C. herein) is 5 V, the magnitudes of voltage of the coil electric current amount detection signal, when divided into 256 steps, have an average of 0.02 V per step. Now, on the assumption that the temperature appropriate for the fixation is 200° C. and the magnitude of voltage of the coil electric current amount detection signal existing at this time is 3.5 V, the magnitudes of voltage of the coil electric current amount detection signal constitute 75 steps from the normal room temperature (20° C.) to 200° C. and the temperature increases by an increment of 2.4° C. per step over this range. Again on the assumption that the elevation of temperature from the normal room temperature (20° C.) to 200° C. is completed in 6 minutes, the waiting time for temperature elevation can be calculated by subtracting the remaining number of steps from the number of steps of the magnitude of voltage of the coil electric current amount detection signal to be detected during the temperature elevation.

Figure 8:
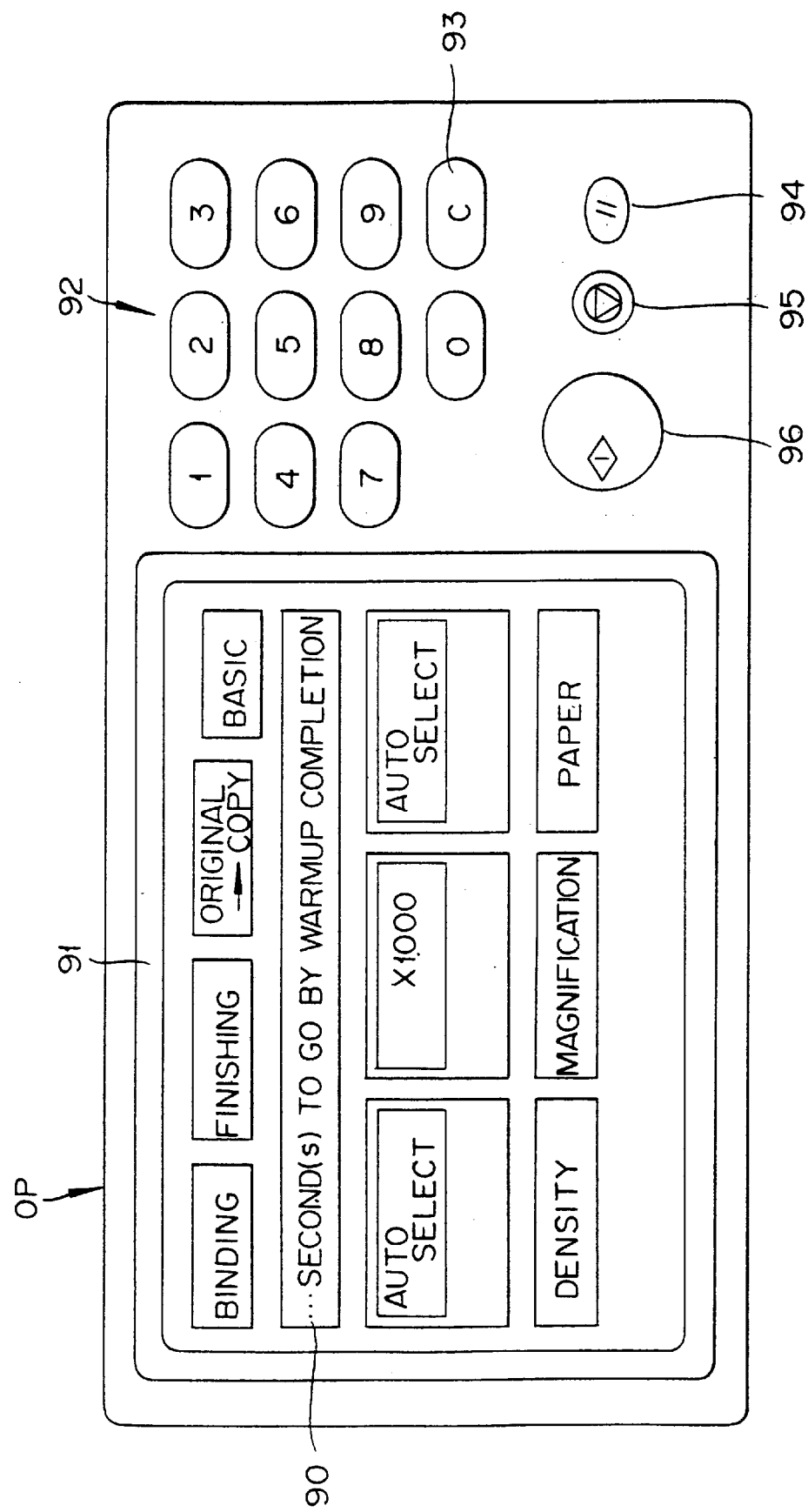
FIG. 8 is a diagram illustrating one example of an operating panel.

When the temperature of the fixing roller is 100° C., for example, the number of steps of the magnitudes of voltage of the coil electric current amount detection signal is calculated as (100−20)/2.4=33.3 steps and the remaining number of steps as 75−33.3=41.7 steps. As a result, the remaining time for the completion of the temperature elevation is calculated as 6/75×41.7=3.3 minutes. When the result of the calculation of the residual time performed as described above is displayed on a message display part 90 of the operating panel OP of the copying machine as illustrated in FIG. 8, the user of the copying machine is enabled to know the waiting time as a specific length of time. Of course, the calculation of the residual time and the display of the result of this calculation on the operating panel OP are carried out by the CPU 10.

This calculation, as compared with the calculation of the residual time by the detection of temperature with a thermistor 61, allows the residual time to be accurately displayed because it does not need to make such indirect measurement of temperature as is performed by a thermistor and gives rise to no time lag between the change of temperature of the fixing roller 1 and the change of temperature of the thermistor. On the operating panel OP illustrated in FIG. 8, a liquid crystal touch panel 91 for setting various functions and displaying the message display part 90, a ten key 92, a clear key 93, a temporary waiting key 94, a copy stop key 95, and a copy start key 96 are laid out.

Further in Embodiment 1, the electric current which is flowing to the induction coil 3 and is detected by the detection coil 51 is relied on to discern between the presence and the absence of the actual passage of electricity to the induction coil 3 (hereinafter this detection will be referred to as "detection of electrification"). This detection of electrification is implemented by causing the comparator 31 to compare the voltage V1 obtained by transforming the induced electromotive force generated in the detection coil 51 into a direct current by the bridge circuit 52 and the smoothing capacitor 53 with the standard voltage V2 supplied by the resistance elements 32 and 33. The standard voltage V2 in this case is equalized with the smallest possible magnitude of V1, namely the magnitude of V1 which exists when the surface temperature of the fixing roller 1 rises to the highest level. When V1>V2 is satisfied, the comparator 31 issues a signal of electrification detection as an output to an input port c of the CPU 10. When V1=0 indicating the absence of electrification is satisfied, the absence of the electrification is discerned because the comparator 31 does not issue a signal of the detection of electrification. Here, the expression "V1 which exists when the surface temperature of the fixing roller 1 rises to the highest level" means the magnitude of the V1 which is assumed when the temperature of the fixing roller in Embodiment 1 reaches 230° C. When the surface temperature reaches the highest level in Embodiment 1, the thermostat 60 which is provided for preventing abnormal heating is cut off and the passage of electricity to the coil 3 is interrupted. If the magnitude of V1 falls short of the standard voltage V2, therefore, the thermostat 60 will interrupt the passage of electricity.

The comparator 31, as shown in the diagram, is intended to issue a low voltage signal (equivalent to a logical value "0") when the signal voltage of a reverse input terminal (−) for introducing V1 is higher than the input voltage of a positive input terminal (+) (V1>V2).

Further in Embodiment 1, the EX-NOR element 42 which uses as input data therefor the signal of electrification detection mentioned above and the SSR control signal issued by the CPU 10 for the control of the SSR 11 is relied on to diagnose a trouble in the induction coil 3 or the wire thereof and the SSR 11. To be specific, on the assumption that the EX-NOR element 42 uses the SSR control signal from an output port f of the CPU 10 as an output A and the signal of electrification detection issued from the comparator 31 as an input B and consequently emits an output Y, the diagnosis of trouble is accomplished by the reception of this output Y through an input port e of the CPU 10.

If the SSR control signal is ON (the logical value "0" of the input A) and the signal of electrification detection indicates the presence of electrification (the logical value "0" of the input B), the output Y of the EX-NOR element 42 will assume the value of "1" and the absence of abnormality from the SSR 11 and from the induction coil 3 and the wire 12 will be discerned. If the SSR control signal is OFF (the logical value "1" of the input A) and the signal of electrification detection indicates the absence of electrification (the logical value "1" of the input B), the output Y will assume the value of "1" and the absence of abnormality from the SSR 11 and from the induction coil 3 and the wire 12 will be discerned. If the SSR control signal is OFF (the logical value "1" of the input A) and the signal of electrification detection indicates the presence of electrification (the logical value "0" of the input B), the output Y will assume the value of "0." In this case, the CPU 10 compares the SSR control signal (the state of the output port f) with the signal of electrification detection (the state of the input port c) and diagnoses the SSR 11 as abnormal. If the SSR control signal is ON (the logical value "0" of the input A) and the signal of electrification detection indicates the absence of electrification (the logical value "1" of the input B), the output Y will assume the value of "0." The CPU 10 compares the SSR control signal (the state of the output port f) with the signal of electrification detection (the state of the input port c) and diagnoses the induction coil 3 or the wire as abnormal. The conditions of these theorems are collectively shown in Table 1. Incidentally, the SSR control signal issued through the output port f of the CPU 10 is intended to produce low voltage (equivalent to the logical value "0") when the SSR 11 is turned on.

TABLE 1

| A | B | Y | Decision |
|---|---|---|----------|
| 0 | 0 | 1 | Normal |
| 0 | 1 | 0 | Abnormality in coil |
| 1 | 0 | 0 | Abnormality in SSR |
| 1 | 1 | 1 | Normal |

Further in Embodiment 1, the signal of electric current detection mentioned above is utilized in effecting such a control as interrupts the passage of electricity to the induction coil 3 when the door in the housing of a copying machine or a printer which accommodates the fixing device is opened.

Figure 9:
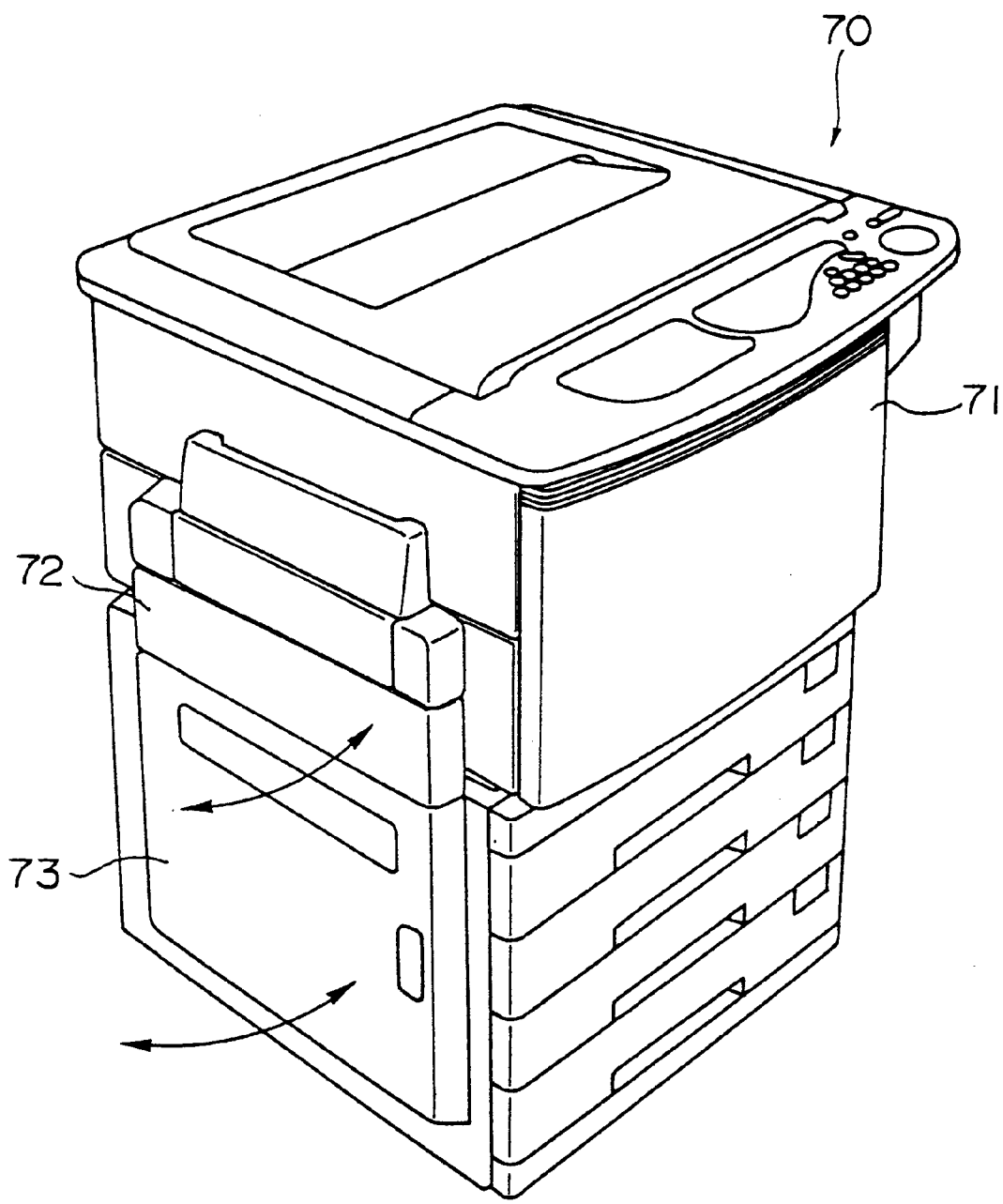
FIG. 9 is a perspective view illustrating one example of the main body of a copying machine.

The main body 70 of a copying machine which accommodates the fixing device, for example, is provided with a plurality of doors including a front door 71 which allows inspection of the interior of the copying machine in case of maintenance and lateral doors 72 and 73 which allow removal of stuck papers as illustrated in FIG. 9. These doors are severally provided with a switch for detecting the opened state of the door. The switch to be used for detecting the open-close state of the door is known in various forms. For example, a limit switch or a photo interrupter (a device in which a light-emitting element and a light-receiving element are paired and, when insulated from each other, are enabled to produce a switching motion) are available.

Figure 10:
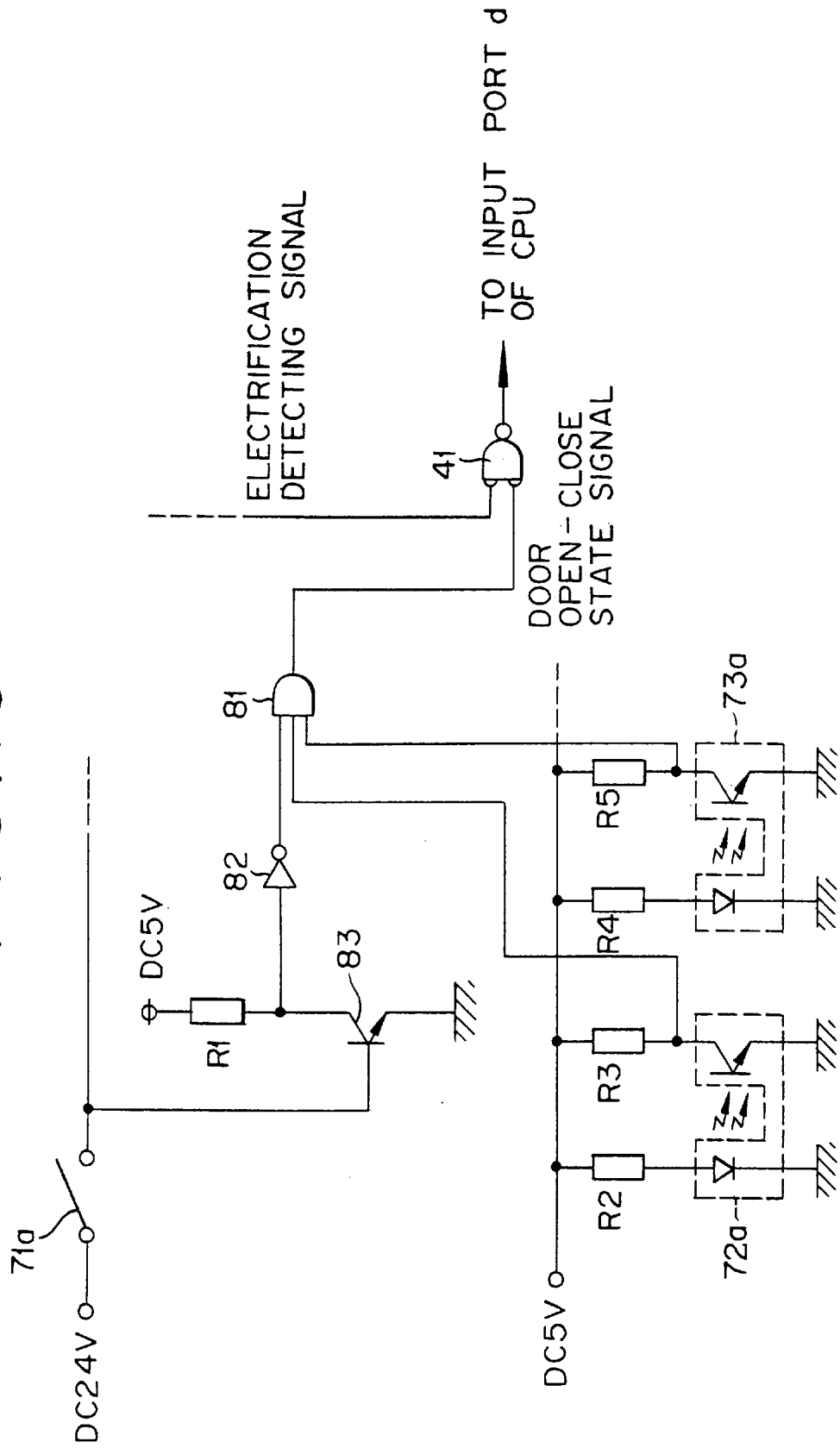
FIG. 10 is a diagram illustrating one example of the construction of a circuit for detecting the open-close state of a door in the induction heating fixing device mentioned above.

FIG. 10 is a diagram illustrating one example of the construction of a circuit for detecting the open-close state of a door and producing a door open-close state signal. In the illustrated construction, the open-close state of the front door 71 is detected by a limit switch 71a using DC 24 V which is adopted for the operation of the main body of the copying machine and the open-close states of the lateral doors 72 and 73 are detected by photo interrupters 72a and 73a. Of course, this mode of switching is not critical. Optionally, all the doors may invariably use limit switches for the detection of their open-close states. Otherwise, all the doors may invariably use photo interrupters for the detection of their open-close states. Further, other sensors may be used to detect the open-close state of each door.

The detection of the open-close state of the front door relies on the ON-OFF motion of the limit switch 71a which switches the gate of a transistor 83. When the limit switch 71*a* is turned ON, the electric current flows to the transistor 83 and the input to an inverter 82 connected to the collector of the transistor 83 assumes a low voltage (equivalent to the logical value "0") and, as a result, the output of the inverter 82, namely the input of an AND element 81, assumes a high voltage (equivalent to the logical value "1"). When the front door is opened, the limit switch 71*a* is turned OFF and the input of the AND element 81 assumes a low voltage (equivalent to the logical value "0").

In contrast, the detection of the open-close state of the lateral door is attained by causing the photo interrupters 72*a* and 73*a* mounted on the lateral door to rely for their operation on a shielding plate intended to form an intercepting wall in the gap of each photo interrupters 72*a* and 73*a*. When the door is closed and the shielding plate is interposed in the gap of the photo interrupter (to intercept the light), a high voltage (equivalent to the logical value "1") is applied to the output thereof, namely the input of the AND element 81. When the door is opened, the input of the AND element 81 assumes a low voltage (equivalent to the logical value "0").

As described above, all the signals detecting the open-close state of the doors are injected into the AND element 81 and from this AND element 81 the door open-close state signal is issued. When all the doors are closed, namely all the inputs of the AND element 81 are "1", the door open-close state signal which is the output from the AND element 81 assumes a high voltage (equivalent to the logical value "1"). When any one of the doors is opened, the output of the AND element 81 assumes a low voltage (equivalent to the logical value "0").

The door open-close state signal which is the output from the AND element 81 is injected into the input port d of the CPU 10. The CPU 10, when this input has low voltage (equivalent to the logical value "0") for its magnitude, stops the output signal to the SSR 11, turns OFF the SSR 11, and interrupts the passage of electricity to the coil 3. Owing to the construction described above, the passage of electricity to the coil 3 is interrupted whenever any of the doors is opened.

Embodiment 2

Unlike Embodiment 1 described above which relies on the signal of the thermistor to control the temperature of the fixing roller which has reached the level appropriate for the fixation, Embodiment 2 is characterized by not relying on the use of a thermistor to control the temperature of the fixing roller after it has reached the level appropriate for the fixation. Here, only the construction, function, and operation of the part characterizing Embodiment 2 will be described below and the construction, function, and operation of Embodiment 2 similar to those of Embodiment 1 will be omitted from the following description.

Figure 11:
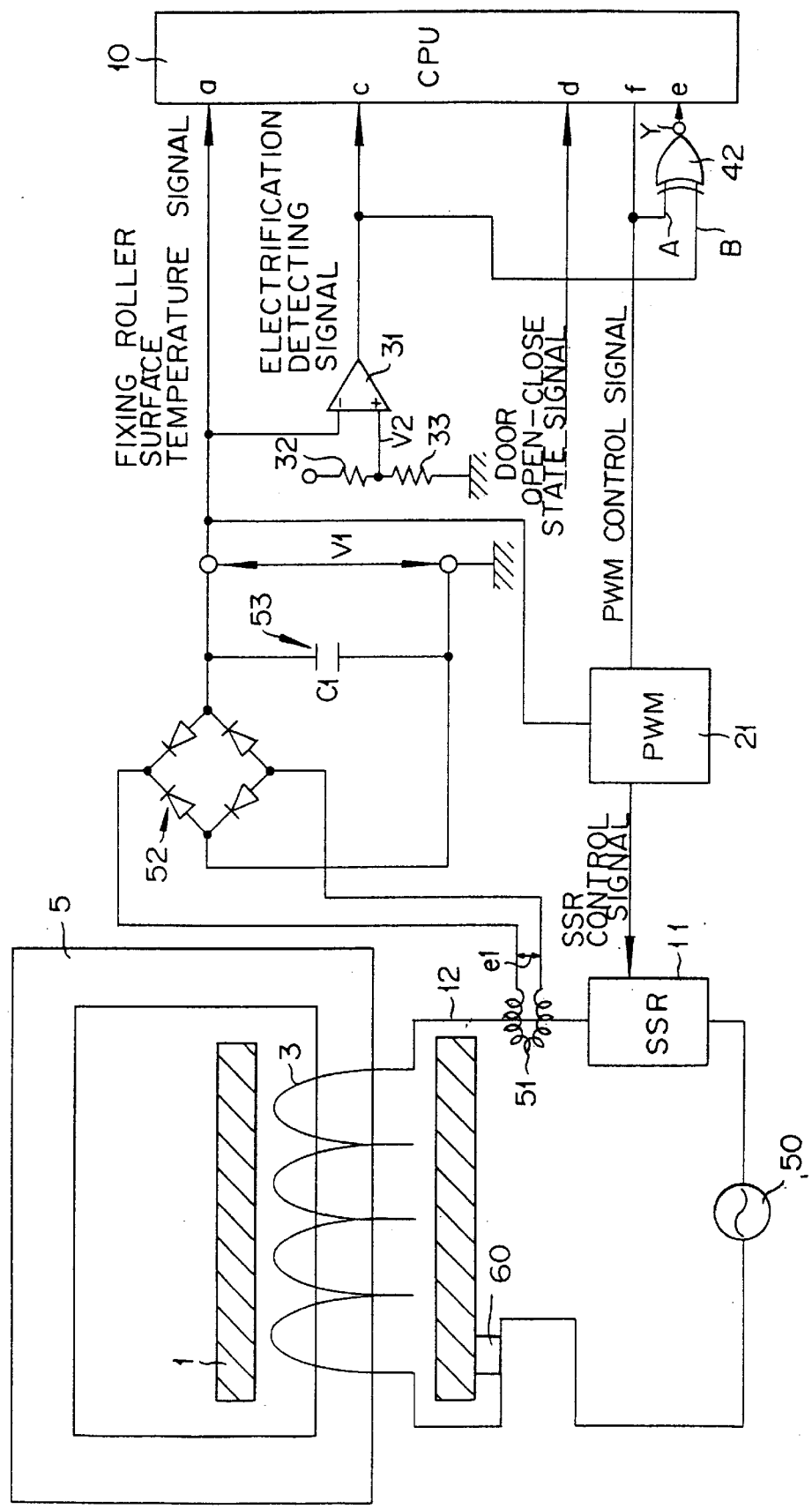
FIG. 11 is a block diagram showing the construction of an electric system in an induction heating fixing device according to another embodiment of this invention.

FIG. 11 is a diagram illustrating the construction of an electric system in Embodiment 2. This construction differs from that of Embodiment 1 in respect that no thermistor is used and also that a PWM (pulse width modulation) circuit 21 is additionally incorporated for controlling the SSR 11 which is switching the passage of electricity to the induction coil 3.

The PWM circuit 21 which is used herein is intended to adjust the temperature of the fixing roller 1 by controlling the SSR 11 when V1 falls in the range of 5–3.5 V or turning off the SSR 11 when V1 falls below 3.5 V, depending on the coil electric current amount detection signal. In the present embodiment, the magnitude of V1 is in the range of 5–3.5 V when the temperature of the fixing roller 1 is in the approximate range of 20–200° C. and it levels off at 3.5 V when the temperature exceeds 200° C. The PWM control signal from the CPU 10 is injected into the PWM circuit 21. This PWM control signal, similarly to that in Embodiment 1 mentioned above, is intended to stop the operation of the PWM circuit 21 itself when the door is opened in response to the door open-close state signal. To be specific, when the door is opened, the PWM control signal from the CPU 10 is in the OFF state and the PWM circuit 21 is prevented from issuing a signal to control the SSR 11 without reference to the magnitude of the coil electric current amount detection signal.

As a result, the detection coil can be harnessed to control the temperature which has reached the level appropriate for the fixation without requiring the use of a thermistor. Naturally, similarly to Embodiment 1, the present embodiment permits this detection coil to be utilized in displaying the waiting time for temperature elevation, detecting the passage of electricity, diagnosing a trouble, and interrupting the passage of electricity when the door is opened while the passage of electricity is in process.

The entire disclosure of Japanese Patent Application No. 8-244498 filed on Sep. 17, 1996 including specification, claims, drawings and summary are incorporated herein by reference in its entirety.

What is claimed is:

1. An image forming apparatus, comprising:
    a fixing roller formed of a conductive member;
    a core passing the interior of said fixing roller;
    an induction coil wound around said core;
    a power source part which supplies a low frequency alternating current to said induction coil;
    a switching circuit which passes or breaks the low frequency alternating current supplied from said power source part to said induction coil;
    a detector which detects the amount of the low frequency alternating current supplied from said power source part to said induction coil;
    a temperature sensor which detects the temperature of said fixing roller; and
    a controller which controls said switching circuit so as to supply the low frequency alternating current to said induction coil until the amount of the low frequency alternating current detected by said detector reaches a prescribed amount and, after the amount of the low frequency alternating current detected by said detector has reached said prescribed amount, controls said switching circuit so as to pass or break the low frequency alternating current to said induction coil based on the temperature detected by said temperature sensor.

2. An image-forming apparatus according to claim 1, wherein said detector detects an induced electromotive force generated by the low frequency alternating current flowing through a wire laid between said power source part and said induction coil.

3. An image-forming apparatus according to claim 1, wherein said power source part guides an electric current supplied from a commercial power source to said induction coil as the low frequency alternating current.

4. An image-forming apparatus according to claim 1, wherein said controller interrupts the supply of the low frequency alternating current to said induction coil when the amount of the low frequency alternating current detected by said detector lowers to said prescribed amount.

5. An image-forming apparatus according to claim 1, wherein the low frequency alternating current is in the range of 50 Hz to 60 Hz.

6. An image-forming apparatus according to claim 1, wherein the low frequency alternating current coil decreases as the temperature of said induction coil increases.

7. An image-forming apparatus according to claim 1, wherein said detector includes a rectifier for converting a detected alternating current signal into a direct current signal, and said direct current signal is provided to said controller.

8. An image-forming apparatus according to claim 1, wherein said switching circuit is a solid state relay switch which prevents noise from said power source from entering said controller.

9. An image-forming apparatus, comprising:
a fixing roller formed of a conductive member;
a core passing the interior of said fixing roller;
an induction coil wound around said core;
a power source part which supplies a low frequency alternating current to said induction coil;
a detector which detects the amount of the low frequency alternating current supplied from said power source part to said induction coil; and
a controller which estimates the temperature of said fixing roller based on the amount of the low frequency alternating current detected by said detector and, based on the estimated temperature, predicts the time which elapses until a prescribed temperature is reached.

10. An image-forming apparatus according to claim 9, wherein said detector detects an induced electromotive force generated by the low frequency alternating current flowing through a wire laid between said power source part and said induction coil.

11. An image-forming apparatus according to claim 9, wherein said power source part guides an electric current supplied from a commercial power source to said induction coil as the low frequency alternating current.

12. An image-forming apparatus according to claim 9, which further comprises a display part which displays the time predicted by said controller.

13. An image-forming apparatus according to claim 9, wherein the low frequency alternating current is in the range of 50 Hz to 60 Hz.

14. An image-forming apparatus according to claim 9, wherein the low frequency alternating current decreases as the temperature of said induction coil increases.

15. An image-forming apparatus according to claim 9, wherein said detector includes a rectifier for converting a detected alternating current signal into a direct current signal, and said direct current signal is provided to said controller.

16. An image-forming apparatus, comprising:
a fixing roller formed of a conductive member;
a core passing the interior or said fixing roller;
an induction coil wound around said core;
a power source part which supplies a low frequency alternating current to said induction coil;
a switching circuit which passes or breaks the low frequency alternating current supplied from said power source part to said induction coil;
a detector which detects the amount of the low frequency alternating current supplied from said power source part to said induction coil; and
a controller which controls said switching circuit so as to supply the low frequency alternating current to said induction coil until the amount of the low frequency alternating current detected by said detector reaches a prescribed amount and, after the amount of the low frequency alternating current detected by said detector has reached said prescribed amount, controls said switching circuit so as to pass or break the low frequency alternating current to said induction coil based on the amount of the low frequency alternating current detected by said detector.

17. An image-forming apparatus according to claim 11, wherein said detector detects an induced electromotive force generated by the low frequency alternating current flowing through a wire laid between said power source part and said induction coil.

18. An image-forming apparatus according to claim 16, wherein said power source part guides an electric current supplied from a commercial power source to said induction coil as the low frequency alternating current.

19. An image-forming apparatus according to claim 16, wherein said controller interrupts the supply of the low frequency alternating current to said induction coil when the amount of the electric current detected by said detector lowers to said prescribed level.

20. An image-forming apparatus according to claim 16, wherein the low frequency alternating current is in the range of 50 Hz to 60 Hz.

21. An image-forming apparatus according to claim 16, wherein the low frequency alternating current in said induction coil decreases as the temperature of said induction coil increases.

22. An image-forming apparatus according to claim 16, wherein said detector includes a rectifier for converting a detected alternating current signal into a direct current signal, and said direct current signal is provided to said controller.

23. An image-forming apparatus according to claim 16, wherein said switching circuit is a solid state relay switch which prevents noise from said power source from entering said controller.

24. An image-forming apparatus, comprising:
a fixing roller formed of a conductive member;
a core passing the interior of said fixing roller;
an induction coil wound around said core;
a power source part which supplies a low frequency alternating current to said induction coil;
a controller which effects such a control as to elevate the temperature of said fixing roller to a prescribed temperature and, at the same time, retain said prescribed temperature by supplying the low frequency alternating current from said power source part to said induction coil; and
a detector disposed on a wire for supplying the low frequency alternating current from said power source part to said induction coil and adapted to detect the fact that a current is flowing through said wire.

25. An image-forming apparatus according to claim 24, wherein said detector detects an induced electromotive force generated by the low frequency alternating current flowing through the wire laid between said power source part and said induction coil.

26. An image-forming apparatus according to claim 24, wherein said power source part guides the low frequency alternating current supplied from a commercial power source to said induction coil.

27. An image-forming apparatus according to claim 24, wherein said controller interrupts the supply of the low frequency alternating current to said induction coil when the amount of the low frequency alternating current detected by said detector lowers to said prescribed level.

28. An image-forming apparatus according to claim 24, wherein a switching circuit for passing or breaking the low frequency alternating current supplied from said power source part to said induction coil is additionally provided and said controller decides whether said induction coil and said switching circuit are functioning normally or not based on the outcome of the detection made by said detector and a signal from the controller used for controlling said switching circuit.

29. An image-forming apparatus according to claim 24, wherein the low frequency alternating current is in the range of 50 Hz to 60 Hz.

30. An image-forming apparatus according to claim 24, wherein the low frequency alternating current in said induction coil decreases as the temperature of said induction coil increases.

31. An image-forming apparatus according to claim 24, wherein said detector includes a rectifier for converting a detected alternating current signal into a direct current signal, and said direct current signal is provided to said controller.

32. An image-forming apparatus, comprising:
a fixing roller formed of a conductive member;
a core passing the interior of said fixing roller;
an induction coil wound around said core;
a power source part which supplies a low frequency alternating current to said induction coil;
a first detector disposed on a wire which supplies the low frequency alternating current from said power source part to said induction coil and is adapted to detect the fact that an electric current is flowing through said wire;
a second detector which detects the open-close state of a door of said image-forming apparatus; and
a controller which effects such a control as to interrupt the supply of the low frequency alternating current to said induction coil when said door is opened while the flow of the the low frequency alternating current through said wire is present in accordance with the outcome of the detection of said first detector and said second detector, and which estimates the temperature of said fixing roller based on the amount of the low frequency alternating current detected by said first detector and, based on the estimated temperature, predicts the time which elapses until a prescribed temperature is reached.

33. A fixing device, comprising:
a fixing roller formed of a conductive member;
a core passing the interior of said fixing roller;
an induction coil wound around said core and supplied with a low frequency alternating current from a power source;
a switching circuit which passes or breaks the low frequency alternating current supplied to said induction coil;
a detector which detects the amount of the low frequency alternating current supplied to said induction coil,
a temperature sensor which detects the temperature of said fixing roller; and a controller which controls said switching circuit so as to supply the low frequency alternating current to said induction coil until the amount of the low frequency alternating current detected by said detector reaches a prescribed amount and, after the amount of the low frequency alternating current detected by said detector has reached said prescribed amount, controls said switching circuit so as to pass or break the low frequency alternating current to said induction coil based on the temperature detected by said temperature sensor.

34. A fixing device, comprising:
a fixing roller formed of a conductive member;
a core passing the interior of said fixing roller;
an induction coil wound around said core and supplied with a low frequency alternating current from a power source;
a detector which detects the amount of the low frequency alternating current supplied to said induction coil; and
a controller which estimates the temperature of said fixing roller based on the amount of the low frequency alternating current detected by said detector and, based on the estimated temperature, predicting the time which elapses until the prescribed temperature is reached.

35. A fixing device, comprising
a fixing roller formed of a conductive member;
a core passing the interior of said fixing roller;
an induction coil wound around said core and supplied with a low frequency alternating current from a power source;
a switching circuit which passes or breaks the low frequency alternating current supplied to said induction coil;
a detector which detects the amount of the low frequency alternating current supplied to said induction coil; and
a controller which controls said switching circuit so as to supply the low frequency alternating current to said induction coil until the amount of the low frequency alternating current detected by said detector reaches a prescribed amount and, after the amount of the low frequency alternating current detected by said detector has reached said prescribed amount, controls said switching circuit so as to pass or break the low frequency alternating current to said induction coil based on the amount of the low frequency alternating current detected by said detector.

36. A fixing device, comprising:
a fixing roller formed of a conductive member;
a core passing the interior of said fixing roller;
an induction coil wound around said core and supplied with a low frequency alternating current from a power source;
a controller which effects such a control as to elevate the temperature of said fixing roller to a prescribed temperature and retain said prescribed temperature by supplying the low frequency alternating current to said induction coil; and
a detector disposed on a wire for supplying the low frequency alternating current from said power source part to said induction coil and adapted to detect the fact that a current is flowing through said wire.

37. An fixing device, comprising:
a fixing roller formed of a conductive member;
a core passing the interior of said fixing roller;
an induction coil wound around said core and supplied with a low frequency alternating current from a power source;

a first detector disposed on a wire supplying the low frequency alternating current to said induction coil and adapted to detect the fact that an electric current is flowing through said wire;

a second detector which detects the open-close state of a door of a housing accommodating said fixing device; and a controller which effects such a control as to interrupt the supply of the low frequency alternating current to said induction coil when said door is opened while the flow of the low frequency alternating current through said wire is present in accordance with the outcome of the detection of said first detector and said second detector, and which estimates the temperature of said fixing roller based on the amount of the low frequency alternating current detected by said first detector and, based on the estimated temperature, predicts the time which elapses until a prescribed temperature is reached.

38. A fixing apparatus comprising:

an induction heating device using a low frequency alternating current from a power source;

a switching circuit which passes or breaks the low frequency alternating current supplied to said induction heating device;

a detector which detects the amount of the low frequency alternating current supplied to said induction heating device; and a controller which controls said switching circuit so as to supply the low frequency alternating current to said induction heating device until the amount of the low frequency alternating current detected by said detector reaches a prescribed amount and, after the amount of the low frequency alternating current detected by said detector has reached said prescribed amount, controls said switching circuit so as to pass or break the low frequency alternating current to said induction heating device based on the amount of the low frequency alternating current detected by said detector.

\* \* \* \* \*

UNITED STATES PATENT AND TRADEMARK OFFICE
CERTIFICATE OF CORRECTION

PATENT NO. : 5,911,094
DATED : June 8, 1999
INVENTOR(S) : Tsujimoto

It is certified that error appears in the above-identified patent and that said Letters Patent is hereby corrected as shown below:

In the claims:

Claim 17, line 1, change "11" to --16--.

Claim 37, line 1, change "An" to --A--.

Signed and Sealed this

Twenty-first Day of November, 2000

Attest:

Q. TODD DICKINSON

Attesting Officer

Director of Patents and Trademarks